United States Patent
Wietelmann et al.

(10) Patent No.: US 10,522,819 B2
(45) Date of Patent: Dec. 31, 2019

(54) STABILISED (PARTIALLY) LITHIATED GRAPHITE MATERIALS, METHODS FOR THE PRODUCTION THEREOF AND USE FOR LITHIUM BATTERIES

(71) Applicant: Rockwood Lithium GmbH, Frankfurt am Main (DE)

(72) Inventors: Ulrich Wietelmann, Friedrichsdorf (DE); Vera Nickel, Haiger (DE); Stefan Scherer, Griesheim (DE); Ute Emmel, Frankfurt am Main (DE); Thorsten Buhrmester, Darmstadt (DE); Steffen Haber, Bad Soden (DE); Gerd Krämer, Bad Vilbel (DE)

(73) Assignee: Albemarle Germany GmbH, Frankfurt am Main ( * ) Notice: Subject to any disclaimer, the term of this patent is extended or adjusted under 35 U.S.C. 154(b) by 332 days.

(21) Appl. No.: 15/116,568

(22) PCT Filed: Feb. 13, 2015

(86) PCT No.: PCT/EP2015/053040
§ 371 (c)(1),
(2) Date: Aug. 4, 2016

(87) PCT Pub. No.: WO2015/121392
PCT Pub. Date: Aug. 20, 2015

(65) Prior Publication Data
US 2016/0351888 A1  Dec. 1, 2016

(30) Foreign Application Priority Data
Feb. 13, 2014  (DE) .................. 10 2014 202 657

(51) Int. Cl.
| | | |
|---|---|---|
| *H01M 4/131* | (2010.01) | |
| *H01M 4/133* | (2010.01) | |
| *H01M 4/04* | (2006.01) | |
| *H01M 4/1393* | (2010.01) | |
| *H01M 4/36* | (2006.01) | |
| *H01M 4/587* | (2010.01) | |
| *H01M 4/62* | (2006.01) | |
| *H01M 10/0525* | (2010.01) | |
| *H01M 10/0569* | (2010.01) | |
| *C01B 32/22* | (2017.01) | |
| *H01M 4/02* | (2006.01) | |

(52) U.S. Cl.
CPC ............ *H01M 4/133* (2013.01); *C01B 32/22* (2017.08); *H01M 4/0404* (2013.01); *H01M 4/1393* (2013.01); *H01M 4/366* (2013.01); *H01M 4/587* (2013.01); *H01M 4/622* (2013.01); *H01M 4/623* (2013.01); *H01M 10/0525* (2013.01); *H01M 10/0569* (2013.01); H01M 2004/027 (2013.01); H01M 2300/0028 (2013.01)

(58) Field of Classification Search
CPC .. H01M 4/133; H01M 4/0404; H01M 4/1393; H01M 4/366; H01M 4/587; H01M 4/622; H01M 4/523; H01M 10/0525; H01M 10/0569; C01B 32/33
See application file for complete search history.

(56) References Cited

U.S. PATENT DOCUMENTS

| | | | |
|---|---|---|---|
| 6,896,706 | B2 | 5/2005 | Lee et al. |
| 2005/0074670 | A1 | 4/2005 | Azuma |
| 2005/0130043 | A1 | 6/2005 | Gao et al. |
| 2006/0194115 | A1 | 8/2006 | De Jonghe et al. |
| 2008/0283155 | A1 | 11/2008 | Yakovleva et al. |
| 2009/0148773 | A1 | 6/2009 | Volkov et al. |
| 2010/0081054 | A1 | 4/2010 | Zhao |
| 2011/0039145 | A1 | 2/2011 | Abe et al. |
| 2011/0309310 | A1 | 12/2011 | Keller et al. |
| 2013/0045427 | A1 | 2/2013 | Zhamu et al. |
| 2013/0181160 | A1 | 7/2013 | Wietelmann |
| 2014/0170503 | A1 | 6/2014 | Yushin et al. |
| 2015/0010826 | A1 | 1/2015 | Wietelmann et al. |
| 2015/0295233 | A1 | 10/2015 | Mutoh et al. |

FOREIGN PATENT DOCUMENTS

| | | |
|---|---|---|
| CN | 1427490 A | 7/2003 |
| CN | 102130359 A | 7/2011 |
| CN | 102642024 A | 8/2012 |
| DE | 11 2004 001344 T5 | 6/2006 |
| DE | 10 2012 209313 A1 | 12/2013 |
| JP | 09147835 A | 6/1997 |
| JP | 10106569 A | 4/1998 |
| JP | 1125975 A | 1/1999 |
| JP | 2 960834 B2 | 10/1999 |
| JP | 2001266874 A | 9/2001 |
| JP | 2002373657 A | 12/2002 |
| JP | 2004119350 A | 4/2004 |
| WO | 2012052265 A1 | 4/2012 |
| WO | 2013104787 A1 | 7/2013 |
| WO | 2013149807 A2 | 10/2013 |

OTHER PUBLICATIONS

Ammar, M.R.; "Characterization of Graphite Implanted with Chlorine Ions Using Combined Raman Microspectrometry and Transmission Electron Microscopy on Thin Sections Prepared by Focused Ion Beam"; Carbon 48 (2010); pp. 1244-1251.

(Continued)

*Primary Examiner* — Helen Oi K Conley
(74) *Attorney, Agent, or Firm* — Marcy M. Hoefling; Troy Kleckley; Nathan C. Dunn

(57) ABSTRACT

Described is a coated, (partly) lithiated graphite powder characterized in that it has been produced in a non-electrochemical process from metallic lithium and graphite in powder form and has been stabilized outside an electrochemical cell by application of a coating layer; and a galvanic cell comprising a cathode, a lithium-conductive electrolyte-separator system and an anode comprising a coated, (partly) lithiated graphite powder, where the (partial) lithiation and the coating of the graphite powder are performed non-electrochemically outside the galvanic cell (ex situ).

14 Claims, No Drawings

(56) References Cited

OTHER PUBLICATIONS

Bhardwaj, Sunil et al.; "Carbon Material From Natural Sources as an Anode in Lithium Secondary Battery"; Carbon Letters; vol. 8; No. 4 Dec. 2007; pp. 285-291.

Decaux, C. et al.; "Electrochemical Performance of a Hybrid Lithium-ion Capacitor with a Graphite Anode Preloaded from Lithium Bis(trifluoromethane)sulfonimide-based Electrolyte"; Electrochimica Acta 86 (2012) pp. 282-286.

Ferrari, A.G. et al.; "Interpretation of Raman Spectra of Disordered and Amorphous Carbon"; Physical Review B; vol. 61; No. 20; May 15, 2000; pp. 14095-14107.

Guerard, D. et al.; "New Method of Preparation of Lithium Insertion Compounds in Graphite"; C.R. Acad. Sc. Paris, t. 275 Sep. 11, 1972; Series C; pp. 571-572; 5 pages with translation.

Guoping, Wang et al.; "A Modified Graphite Anode With High Initial Efficiency and Excellent Cycle Life Expectation"; Solid State Ionics; 176 (2005) pp. 905-909.

Imanishi, Nobuyuki.; "Development of the Carbon Anode in Lithium Ion Batteries", in: M. Wakihara and O. Yamamoto (ed). in: Lithium Ion Batteries: Fundamentals and Performance; Wiley-VCH, Weinheim; (1998); pp. 98-126.

Janot, Raphaël et al.; "Ball-Milling in Liquid Media Applications to the Preparation of Anodic Materials for Lithium-ion Batteries"; Elsevier; Progress in Materials Science; 50 (2005) pp. 1-92.

Kurzweil, P. et al.; "Secondary Batteries—Lithium Rechargeable Systems" in Encyclopedia of Electrochemical Power Sources; J. Garche (ed.), Elsevier Amsterdam 2009, vol. 5, pp. 1-26 (28 pages).

Lex-Balducci, Alexandra et al.; "Electrolytes for Lithium-Ion Batteries"; in Lithium-Ion Batteries, Advanced Materials and Technologies; X. Yuan, H. Liu and J. Zhang (ed.), CRC Press Boca Raton, 2012, pp. 147-196 (52 pages).

Meyer, Benjamin et al.; "Application of Stabilized Lithium Metal Powder in Lithium Ion Batteries"; Proc. Power Sourc. Conf. 2008, 43rd, pp. 105-108.

Rhim, Yo-Rhin et al.; "Changes in Electrical and Microstructural Properties of Microcrystalline Cellulose as Function of Carbonization Temperature"; Carbon 48 (2010); pp. 1012-1024.

Yazami, R.; "Some Aspects on the Preparation, Structure and Physical and Electrochrmical Properties of $Li_xC_6$"; Journal of Power Sources; 43-44 (1993) pp. 39-46.

Ji, Liwen et al.; "Recent Developments in Nanostructured Anode Materials for Rechargeable Lithium-ion Batteries"; Energy & Environ. Sci.; 2011, 4, pp. 2682-2699.

Komaba, S., et al., "Alkali Carbonate-Coated Graphite Electrode for Lithium-ion Batteries", Carbon, 46, 2008, pp. 1184-1193.

Nakajima, T., et al., "Reactions of metallic Li or LiCe with organic solvents for lithium ion battery", Journal of Power Sources, 243, 2013, pp. 581-584.

Ferrari, A.C. et al.; "Resonant Raman spectroscopy of disordered, amorphous, and diamondlike carbon"; Physical Review B; vol. 64; Published Jul. 26, 2001; 13 pages.

Powder. From Wikipedia, the free encyclopedia. Website, https://en.wikipedia.org/wiki/Powder, visited on Jun. 19, 2019. 6 pages.

Holdich, Richard G., Fundamentals of Particle Technology, Midland Information Technology and Publishing, 2002, Chapter 10, "Powder Flow and Storage", 16 pages.

STABILISED (PARTIALLY) LITHIATED GRAPHITE MATERIALS, METHODS FOR THE PRODUCTION THEREOF AND USE FOR LITHIUM BATTERIES

CROSS-REFERENCE TO RELATED APPLICATIONS

This application is a National Stage of International Application No. PCT/EP2015/053040, filed on Feb. 13, 2015, which application claims priority from German Patent Application No. 10 2014 202 657.1, filed Feb. 13, 2014. Each patent application identified above is incorporated here by reference in its entirety.

BACKGROUND

Electrochemical cells for lithium ion batteries are as standard constructed in the discharged condition. The advantage of this is that both electrodes are present in an air- and water-stable form. The electrochemically active lithium is here exclusively introduced in the form of the cathode material. The cathode material contains lithium metal oxides such as for example lithium cobalt oxide ($LiCoO_2$) as an electrochemically active component. The anode material in the currently commercial batteries contains, in the discharged condition, a graphitic material having a theoretically electrochemical capacity of 372 Ah/kg as the active mass. As a rule, it is completely free of lithium. In future designs, also materials (also free of lithium) having a higher specific capacity may be used, for example alloy anodes, frequently on the basis of silicon or tin.

In real battery systems, part of the lithium introduced with the cathode material is lost as a result of irreversible processes, above all during the first charging/discharging process. Moreover, the classical lithium ion battery design with lithium-free graphite as the anode has the disadvantage that lithium-free potential cathode materials (e.g. $MnO_2$) cannot be used.

In the case of graphite it is assumed that above all oxygen-containing surface groups react, during the first battery charging process, irreversibly with lithium to form stable salts. This part of the lithium is lost for the subsequent electrochemical charging/discharging processes, because the salts formed are electrochemically inactive. The same applies to the case of alloy anodes, for example silicon or tin anode materials. Oxidic impurities consume lithium according to:

$$MO_2 + 4Li \rightarrow M + 2Li_2O \quad (1)$$

(M=Sn, Si and others)

The lithium bound in the form of $Li_2O$ is no longer electrochemically active. If anode materials having a potential of < approx. 1.5 V are used, a further part of the lithium is irreversibly consumed on the negative electrode for the formation of a passivation layer (so-called solid electrolyte interface, SEI). In the case of graphite, a total of approx. 7 to 20% by weight of the lithium introduced with the positive mass (i.e. the cathode material) is lost in this way. In the case of tin and silicon anodes, these losses are usually even higher. The "remaining" transition metal oxide (for example $CoO_2$) delithiated according to the following equation (2) cannot, due to a lack of active lithium, make any contribution to the reversible electrochemical capacity of the galvanic cell:

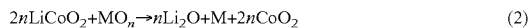

$$2nLiCoO_2 + MO_n \rightarrow nLi_2O + M + 2nCoO_2 \quad (2)$$

(M=Si, Sn etc.; n=1 or 2)

There have been many examinations with a view to minimise or completely compensate these irreversible losses of the first charging/discharging cycle. This limitation can be overcome by introducing additional lithium in a metallic form, for example as a stabilised metal powder ("SLMP") into the battery cell (e.g. US2008283155A1; B. Meyer, F. Cassel, M. Yakovleva, Y. Gao, G. Au, Proc. Power Sourc. Conf. 2008, 43rd, 105-108). However, the disadvantage of this is that the usual methods for producing battery electrodes for lithium ion batteries cannot be carried out. Thus, according to the prior art, passivated lithium reacts with the main air components of oxygen and nitrogen. Although the kinetics of this reaction are very decelerated compared to non-stabilised lithium, however, after prolonged exposure to air, also under dry room conditions, a change in the surfaces and a decrease in metal content cannot be avoided. The extremely vehement reaction of Li metal powder with the solvent N-methyl-pyrrolidone (NMP), which is often used for preparing electrodes, has to be regarded as an even more serious disadvantage. Although significant progress in the direction of a safer handling could be made by providing stabilised or coated lithium powders, however, the stability of the lithium powder stabilised according to the prior art was frequently not sufficient in order to guarantee, under practical conditions, a safe use of passivated lithium powder in the case of NMP-based electrode production methods (suspension methods). Whilst uncoated or deficiently coated metal powders may vehemently react with NMP even at room temperature as early as after a brief induction period (thermal run away), in the case of coated lithium powder this process will occur only at elevated temperatures (for example 30 to 80° C.). Thus, US2008/0283155 describes that the lithium powder coated with phosphoric acid from example 1 reacts extremely vehemently (run away) immediately after mixing them together at 30° C., whereas a powder additionally coated with a wax at 30° C. in NMP will be stable for at least 24 h. The lithium powders coated according to WO2012/052265 are kinetically stable in NMP up to approx. 80° C., however, they decompose exothermically at temperatures beyond that, mostly under phenomena of the run away type. For mainly this reason, the use of lithium powders as a lithium reservoir for lithium ion batteries or for pre-lithiation of electrode materials has so far been commercially unsuccessful.

Alternatively, additional electrochemically active lithium can be introduced into an electrochemical lithium cell also by adding graphite lithium intercalation compounds ($LiC_x$) to the anode. Such Li intercalation compounds may be produced either electrochemically or chemically.

The electrochemical production is carried out automatically during charging of conventional lithium ion batteries. As a result of this process, materials with a lithium:carbon stoichiometry of no more than 1:6.0 may be obtained (see e.g. N. Imanishi, "Development of the Carbon Anode in Lithium Ion Batteries", in: M. Wakihara and O. Yamamoto (ed). in: Lithium Ion Batteries, Wiley-VCH, Weinheim 1998). The partially or fully lithiated material produced in this way can in principle be taken from a charged lithium ion cell under a protective gas atmosphere (argon) and can be used, after appropriate conditioning (washing with suitable solvents and drying), for new battery cells. Due to the extensive efforts associated with this, this approach is chosen only for analytical examination purposes. For economic reasons, this method has no practical relevance.

Further, there are preparative chemical approaches for lithiating graphite materials. It is known that lithium vapour reacts with graphite at a temperature starting from 400° C. to form lithium intercalation compounds (lithium intercalates). However, once 450° C. is exceeded, undesired lithium carbide $Li_2C_2$ forms. The intercalation reaction works well with highly oriented graphite (HOPG=Highly Oriented Pyrolytic Graphite). If liquid lithium is used, a temperature of just 350° C. is sufficient (R. Yazami, J. Power Sources 43-44 (1993) 39-46). The use of high temperatures is generally unfavourable for energetic reasons. Added to this, in the case of the use of lithium, are the high reactivity and corrosiveness of the alkali metal. Therefore, this production variant is also without any commercial significance.

In the case of the use of extremely high pressures (2 GPa, corresponds to 20,000 atm), lithium intercalation can be achieved even at room temperature (D. Guerard, A. Herold, C. R. Acad. Sci. Ser. C., 275 (1972) 571). Such high pressures can be achieved only in highly specialised hydraulic presses which are suitable only for the production of minute laboratory-scale quantities. This means that this is not an industrially suitable method for producing commercial quantities of lithium graphite intercalation compounds.

Finally, the production of lithiated natural graphite (Ceylon graphite) by means of high energy grinding in a ball mill has been described. To this end, the predominantly hexagonally structured natural graphite from today's Sri Lanka is reacted with lithium powder (170 µm average particle size) in Li:C ratios of 1:6; 1:4 and 1:2. A complete lithiation into the final molar ratio $LiC_6$ could be achieved only with a molar ratio of 1:2 (R. Janot, D. Guerard, Progr. Mat. Sci. 50 (2005) 1-92). This synthesis variant is also disadvantageous from a technical and commercial point of view. On the one hand, a very high lithium excess is needed in order to achieve a sufficient or complete lithiation. The vast majority of the lithium is lost (in the mill or on the grinding balls) or is not intercalated (i.e. is still present in the elementary form). On the other hand, as a rule no unconditioned natural graphite is used for the production of anodes for lithium ion batteries. The reason is that the mechanical integrity of natural graphite is irreversibly destroyed during battery cycles as a result of so-called exfoliation by the intercalation of solvatised lithium ions (see P. Kurzweil, K. Brandt, "Secondary Batteries—Lithium Rechargeable Systems" in Encyclopaedia of Electrochemical Power Sources, J. Garche (ed.), Elsevier Amsterdam 2009, vol. 5, pages 1-26). Therefore, more stable synthetic graphites are used. Such synthetic graphites are less crystalline and have a lower degree of graphitisation. Finally, the long grinding times of preferably 12 hours (page 29) that are needed for natural graphites are of disadvantage.

For the reasons mentioned above, the method described has never been commercialised.

In the publication by Janot and Guerard as listed above, also the application properties of the lithiated Ceylon graphite are described (chapter 7). Electrode production is carried out by simply pressing the graphite onto a copper network. As a counter and reference electrode, lithium strips are used, as the electrolyte, a 1 M $LiClO_4$ solution in EC/DMC is used. The type of electrode preparation by simple pressing on does not correspond to the prior art as applied in commercial battery electrode production. A simple compression without the use of a binder and, if necessary, adding conductivity additives, does not result in stable electrodes since the volume changes occurring during charging/discharging will by necessity lead to crumbling of the electrodes, as a result of which the functionality of the battery cell is destroyed.

A further disadvantage in connection with the use of graphite lithium intercalates consists in the fact that the latter behave reactively towards functionalised solvents, for example ethylene carbonate (EC), i.e.

they can react exothermically. Thus, the mixture of $Li_{0.99}C6$ and EC shows a clearly exothermic behaviour when exceeding 150° C. Similar mixtures with diethyl carbonate, dimethyl carbonate and ethyl methyl carbonate react as early as from approx. 110° C. with lithium graphite intercalation compounds (T. Nakajima, J. Power Sources 243 (2013) 581).

DETAILED DESCRIPTION

The invention is based on the object of indicating a graphite-based material that is partially or completely lithiated under formation of lithium intercalates for use in lithium battery anodes, which can be handled well and above all in a safe manner even in normal air allows the use of usual manufacturing methods, i.e. in particular an anode production using solvent-based dispersion casting and coating methods, and allows in particular the safe use of highly reactive solvents, e.g. of N-methyl-pyrrolidone (NMP).

The object is achieved by partially or completely lithiating graphite in powder form using a non-electrochemical method up to a maximum stoichiometry of $LiC_6$ (this process step will be referred to below as "(partial) lithiation") and will be modified in a subsequent step by applying a stabilising coating.

Surprisingly, this stabilised lithium-containing graphite is substantially less reactive to air and functionalised solvents compared to non-stabilised graphite, therefore handling is improved and it can still be used as a highly capacitive anode material and/or source for active lithium in lithium batteries.

The (partially) lithiated synthesis graphite powders according to the invention are preferably produced using a non-electrochemical method. In a first process step, a graphite in powder form is mixed with lithium metal powder and is reacted by stirring, grinding and/or compressing for forming Li graphite intercalates of the composition $LiC_x$ (with x=6-600). Depending on the desired stoichiometry, the two raw materials mentioned are used in a molar ratio Li:C of 1: at least 3 to 1: maximum 600, preferably 1: at least 5 and 1: maximum 600. The lithium introduced via the maximum stoichiometry $LiC_6$ is presumably present on the graphite surface in a finely dispersed form.

The reaction is carried out in a temperature range between 0 and 180° C., preferably between 20 and 150° C., either in vacuum or under an atmosphere, the components of which react, if at all, only acceptably slowly with metallic lithium and/or lithium graphite intercalation compounds. This is preferably either dry air or an inert gas, particularly preferably argon.

The lithium is used in powder form consisting of particles with an average particle size between approx. 5 and 500 µm, preferably between 10 and 200 µm. Both coated powders such as e.g. a stabilised metal powder available from FMC Company (Lectromax powder 100, SLMP) having a lithium content of at least 97% by weight, or for example a powder coated with alloy-forming elements having a metal content of at least 95% by weight (WO2013/104787A1). Particularly preferably, uncoated lithium powders having a metal content of ≥99% by weight are used. For an application in the battery area, the purity in relation to metallic impurities must be very high. The sodium content, inter alia, must not be >200 ppm. Preferably, the Na content is ≤100 ppm, particularly preferably ≤80 ppm.

As graphite, any graphite grades in powder form, both those from natural sources (so-called "natural graphite") and synthetically/industrially produced grades ("synthesis graphites"), may be used. Both macro-crystalline flake graphites and amorphous or micro-crystalline graphites may be used.

The reaction (i.e. the (partial) lithiation) is carried out during mixing, compressing or grinding the two components of lithium powder and graphite powder. On a laboratory scale, grinding can be carried out using a mortar and pestle. Preferably, however, the reaction is carried out in a mill, for example in a rod, vibration or ball mill. Particularly preferably, the reaction is carried out in a planetary ball mill. On a laboratory scale, for example the planetary ball mill Pulverisette 7 Premium Line by the Fritsch Company may be used for this. If planetary ball mills are used, advantageously very short reaction times of <10 h, frequently even <1 h. can surprisingly be realised.

The mixture of lithium and graphite powder is preferably ground in the dry condition. However, it is also possible to add a fluid, which is inert in respect of both substances, up to a weight ratio of no more than 1:1 (sum Li+C:fluid). The inert fluid is preferably an anhydrous hydrocarbon solvent, e.g. a liquid alkane or alkane mixture or an aromatic solvent. As a result of the addition of solvents, the intensity of the grinding process is attenuated and the graphite particles are less intensively ground.

The grinding duration is a function of different requirements and process parameters:
  weight ratio of grinding balls to product mix
  type of grinding balls (e.g. hardness and density)
  intensity of the grinding (revolution frequency of the grinding plate)
  reactivity of the lithium powder (e.g. type of coating)
  weight ratio Li:C
  product-specific material properties
  desired particle size etc.

The suitable conditions may be found by a person skilled in the art by way of simple optimisation experiments. In general, grinding durations fluctuate between 5 minutes and 24 hours, preferably between 10 minutes and 10 hours.

The (partially) lithiated synthesis graphite powder is still "active" under ambient conditions (air and water) as well as in many functionalised solvents and liquid electrolyte solutions, i.e. it reacts or decomposes over prolonged periods of exposure. When moved to normal air, the contained lithium reacts thermodynamically to form stable salts such as lithium hydroxide, lithium oxide and/or lithium carbonate. In order to eliminate this disadvantage at least as much as possible, the (partially) lithiated graphite powders are stabilised by a second process step, a coating process. To this end, the (partially) lithiated synthesis graphite powder is reacted ("passivated") in a suitable manner in a downstream process step with a gaseous or liquid coating agent. Suitable coating agents contain functional groups or molecule moieties that are reactive with metallic lithium as well as lithium graphite intercalation compounds, and therefore react with the lithium available at the surface. A reaction of the lithium-containing surface zone takes place under formation of non- or poorly air-reactive (i.e. thermodynamically stable) lithium salts (such as e.g. lithium carbonate, lithium fluoride, lithium hydroxide, lithium alcoholates, lithium carboxylates). During this coating process, the majority of the lithium located at the particle surface (e.g. the intercalated part) remains in an active form, i.e. with an electrochemical potential of ≤approx. 1 V vs. $Li/Li^+$. Such coating agents are known from lithium ion battery technology as in situ film formers (also referred to as SEI formers) for the negative electrode and are described for example in the following review articles: A. Lex-Balducci, W. Henderson, S. Passerini, Electrolytes for Lithium Ion Batteries, in Lithium-Ion Batteries, Advanced Materials and Technologies, X. Yuan, H. Liu and J. Zhang (ed.), CRC Press Boca Raton, 2012, p. 147-196. Suitable coating agents will be listed below by way of example. $N_2$, $CO_2$, CO, $O_2$, $N_2O$, NO, $NO_2$, HF, $F_2$, $PF_3$, $PF_5$, $POF_3$ and similar are suitable as gases. Suitable liquid coating agents are for example: carbonic acid esters (e.g. vinylene carbonate (VC), vinyl ethylene carbonate (VEC), ethylene carbonate (EC), propylene carbonate (PC), dimethyl carbonate (DMC), diethyl carbonate (DEC), ethyl methyl carbonate (EMC), fluoroethylene carbonate (FEC)); lithium chelatoborate solutions (e.g. lithium bis(oxalato)borate (LiBOB); lithium bis(salicylato) borate (LiBSB); lithium bis(malonato)borate (LiBMB); lithium difluoro(oxalato)borate (LiDFOB), as solutions in organic solvents, preferably selected from: oxygen-containing heterocycles such as THF, 2-methyl-THF, dioxolane, carbonic acid esters (carbonates) such as ethylene carbonate, propylene carbonate, dimethyl carbonate, diethyl carbonate and/or ethyl methyl carbonate, nitriles such as acetonitrile, glutarodinitrile, carboxylic acid esters such as ethyl acetate, butyl formate and ketones such as acetone, butanone); sulphur organic compounds (e.g. sulfites (vinyl ethylene sulfite, ethylene sulphite), sulfones, sultones and similar); N-containing organic compounds (e.g. pyrrole, pyridine, vinyl pyridine, picoline, 1-vinyl-2-pyrrolidinone), phosphoric acid, organic phosphorus-containing compounds (e.g. vinylphosphonic acid), fluorine-containing organic and inorganic compounds (e.g. partially fluorinated hydrocarbons, $PF_3$, $PF_5$, $LiPF_6$, $LiBF_4$, the two last-mentioned compounds dissolved in aprotic solvents), silicon-containing compounds (e.g. silicone oils, alkyl siloxanes), and others.

When using liquid coating agents, the coating process is generally carried out under an inert gas atmosphere (e.g. an argon protective atmosphere) at temperatures between 0 and 150° C. In order to increase the contact between the coating agent and the (partially) lithiated synthesis graphite powder, mixing or stirring conditions are advantageous. The required contact time between the coating agent and the (partially) lithiated synthesis graphite powder is a function of the reactivity of the coating agent, the prevailing temperature and of other process parameters. In general, periods between 1 minute and 24 hours are expedient. The gaseous coating agents are used either in a pure form or preferably in a mixture with a carrier gas, e.g. an inert gas such as argon.

The coating not only improves the handling properties and safety during electrode (in general anode) production, but also the application properties in the electrochemical battery cell. The reason is that, when pre-coated anode materials are used, the in situ formation of an SEI (Solid Electrolyte Interface) during contact of the (partially) lithiated graphite anode material with the liquid electrolytes of the battery cells is eliminated. The anode filming effected by pre-coating outside of the electrochemical cell, corresponds in its properties to a so-called artificial SEI. In an ideal case, the forming process for the electrochemical cell, which is necessary in the prior art, is eliminated or at least simplified.

The graphite powder (partially) lithiated and stabilised according to the method described above can be used for producing battery electrodes. To this end, it is mixed and homogenised, under inert and dry room conditions, with at least one binder material and optionally with one or more further material(s) in powder form, which are capable of intercalating lithium, with an electrochemical potential 2 V vs Li/Li$^+$, as well as also optionally an additive that improves conductivity (e.g. carbon blacks or metal powder), as well as an organic non-aqueous solvent, and this dispersion is applied using a coating process (casting process, spin coating or an air brush method) onto a current collector, and is dried. Surprisingly, the stabilised, (partially) lithiated graphite powders produced using the method according to the invention only have little reactivity in respect of N-methyl-pyrrolidone (NMP) and other functionalised organic solvents. They can therefore be readily processed with the solvent NMP and the binder material PVdF (polyvinylidene difluoride) to form a castable or sprayable dispersion. Alternatively, also the solvents N-ethyl-pyrrolidone, dimethyl sulfoxide, cyclic ethers (e.g. tetrahydrofuran, 2-methyl tetrahydrofuran), ketones (e.g. acetone, butanone) and/or lactones (e.g. γ-butyrolactone) may be used. Further examples of suitable binding materials include: carboxymethyl cellulose (CMC), alginic acid, polyacrylates, Teflon and polyisobutylene (e.g. Oppanol of the BASF Company). If polyisobutylene binders are used, then preferably hydrocarbons (aromatics, e.g. toluene or saturated hydrocarbons, e.g. hexane, cyclohexane, heptane, octane) are preferably used.

The optionally used further material in powder form that is capable of intercalating lithium is preferably selected from the groups including graphites, graphene, layer-structured lithium transition metal nitrides (e.g. $Li_{2.6}Co_{0.4}N$, $LiMoN_2$, $Li_7MnN_4$, $Li_{2.7}Fe_{0.3}N$), metal powders capable of alloying with lithium (e.g. Sn, Si, Al, Mg, Ca, Zn or mixtures thereof), main group metal oxides with a metal which in a reduced form (i.e. as a metal with oxidation stage zero) alloys with lithium (e.g. $SnO_2$, $SiO_2$, SiO, $TiO_2$), metal hydrides (e.g. $MgH_2$, LiH, $TiNiH_x$, $AlH_3$, $LiAlH_4$, $LiBH_4$, $Li_3AlH_6$, $LiNiH_4$, $TiH_2$, $LaNi_{4.25}Mn_{0.75}H_5$, $Mg_2NiH_{3.7}$), lithium amide, lithium imide, tetralithium nitride hydride, black phosphorus as well as transition metal oxides that can react with lithium according to a conversion mechanism under absorption of lithium (e.g. $Co_3O_4$, CoO, FeO, $Fe_2O_3$, $Mn_2O_3$, $Mn_3O_4$, MnO, $MoO_3$, $MoO_2$, CuO, $Cu_2O$). An overview of anode materials that can be used can be seen from the overview article by X. Zhang et al., Energy & Environ. Sci. 2011, 4, 2682. The anode dispersion produced according to the invention, which contains a (partially) lithiated synthesis graphite powder produced by non-electrochemical means, is applied to a current collector foil preferably consisting of a thin copper or nickel sheet, dried and preferably calendared. The anode foil produced in this way can be combined to a lithium battery with an enhanced capacity compared to the prior art by way of a combination with a lithium-conductive electrolyte separator system and a suitable cathode foil containing a lithium compound with a potential of >2 V vs Li/Li$^+$ (e.g. lithium metal oxides such as $LiCoO_2$, $LiMn_2O_4$, $LiNi_{0.5}Mn_{1.5}O_2$ or sulfides such as $Li_2S$, $FeS_2$). The technical production of such galvanic cells (however without the use of the (partially) lithiated synthesis graphite powders according to the invention) is sufficiently known and described (see e.g. P. Kurzweil, K. Brandt, Secondary Batteries, Lithium Rechargeable Systems: Overview, in: Encyclopaedia of Electrochemical Power Sources, ed. J. Garche, Elsevier, Amsterdam 2009, vol. 5, p. 1-26).

The invention relates in particular to:

a coated (partially) lithiated graphite powder of formula LiCx, with x=6-600, which contains intercalated lithium and is coated, using a non-electrochemical method, with thermodynamically stable lithium salts such as lithium carbonate, lithium fluoride, lithium hydroxide, lithium alcoholates, lithium carboxylates as well as, if necessary, further organic and inorganic components, and is stabilised therewith;

coated (partially) lithiated graphite powder that is produced in a non-electrochemical method from metallic lithium and graphite in powder form, and the stabilising coating layer is applied outside of an electrochemical cell;

coated (partially) lithiated graphite powder, wherein the molar ratio of the two atom kinds Li:C is between 1: minimum 3 and 1: maximum 600, preferably between 1: minimum 5 and 1: maximum 600;

coated (partially) lithiated graphite powder, wherein the coating agent is selected from: N2, CO2, carbonic acid esters, lithium chelatoborate solutions in aprotic solvents, sulphur organic compounds, nitrogen-containing organic compounds, phosphoric acid or organic phosphorus-containing compounds, fluorine-containing organic and inorganic compounds and/or silicon-containing compounds;

coated (partially) lithiated graphite powder, wherein as a coating agent, lithium chelatoborate solutions in aprotic organic solvents are used, wherein the lithium chelatoborate is preferably selected from: lithium bis(oxalato)borate (LiBOB); lithium bis(salicylato)borate (LiBSB); lithium bis (malonato)borate (LiBMB); lithium difluoro(oxalato)borate (LiDFOB), and the aprotic organic solvent is preferably selected from: oxygen-containing heterocycles such as tetrahydrofuran (THF), 2-methyl-tetrahydrofuran (2-methyl-THF), dioxolane, carbonates such as ethylene carbonate, propylene carbonate, dimethyl carbonate, diethyl carbonate and/or ethyl methyl carbonate, nitriles such as acetonitrile, glutarodinitrile, carboxylic acid esters such as ethyl acetate, butyl formiate and ketones such as acetone, butanone;

coated (partially) lithiated graphite powder, wherein the coating is carried out in a temperature range between 0 and 150° C.;

a method for producing lithium battery anodes, wherein (partially) lithiated graphite in powder form, coated using a non-electrochemical method, is mixed under inert or dry room conditions with at least one binder material and optionally one or more further materials in powder form, which are capable of intercalating lithium, with an electrochemical potential ≤2 V vs. Li/Li+ as well as also optionally an additive improving conductivity as well as a solvent and is homogenised, and this dispersion is applied onto a current collector foil using a coating method, and is dried;

a method for producing lithium battery anodes, wherein the optionally used further material in powder form, which is capable of intercalating lithium, is selected from the groups consisting of: graphites, graphene, layer-structured lithium transition metal nitrides, metal powder capable of alloying with lithium, main group metal oxides with a metal that alloys with lithium in the reduced form (i.e. as a metal), metal hydrides, lithium amide, lithium imide, tetralithium nitride hydride, black phosphorus; transition metal oxides that are capable of reacting with lithium according to a conversion mechanism under absorption of lithium;

the use of the (partially) lithiated graphite powder produced using the method according to the invention as a component/active material of lithium battery electrodes;

a galvanic cell containing a cathode, a lithium-conductive electrolyte separator system and a graphite-containing anode, wherein the anode contains or consists of a (partially) lithiated graphite powder produced during the cell production (i.e. prior to the first charging cycle) from synthesis graphite and lithium powder by non-electrochemical means and subsequently coated.

EXAMPLES

Example 1

Production of Uncoated $LiC_x$ (x=Approx. 6) from Synthesis Graphite SLP 30 and Uncoated Lithium in a Planetary Ball Mill Under a protective gas atmosphere (argon-filled glove box), 5.00 g of synthesis graphite powder SLP30 from the Timcal Company as well as 0.529 g of uncoated lithium powder with an average particle size of $D_{50}=123$ μm (measurement method: laser reflection, device Lasentec FBRM of the Mettler Toledo Company) are filled into a 50 ml grinding cup from zirconium oxide and mixed using a spatula. Subsequently, approx. 27 g of zirconium oxide grinding balls (ball diameter 3 mm) were filled in. The mixture was ground in a planetary ball mill (Pulverisette 7 Premium Line of the Fritsch Company) for 15 minutes at a rotation frequency of 800 rpm.

The ground product was screened in the glove box, and 4.6 g of a black, gold-glimmering and pourable powder were obtained.

It can be shown using X-ray diffraction analysis that a unitary product with a stoichiometry of C: intercalated Li of approx. 12:1 has formed. Metallic lithium can no longer be detected.

Comparative Example 1

Stability of the Uncoated Lithiated Synthesis Graphite from Example 1 in Contact with NMP as Well as EC/EMC The examination of the thermal stability was carried out using an apparatus of the Systag Company, Switzerland, the Radex system. To this end, the substances or substance mixtures to be examined were weighed into a steel autoclave with a capacity of approx. 3 ml and were heated.

Thermodynamic data can be derived from temperature measurements of the oven and of the vessel.

In the present case, 0.1 g of Li/C mixture or compound with 2 g of EC/EMC were weighed in under inert gas conditions and were heated to a final oven temperature of 250° C. The mixture of the LiCx material according to the invention and EC/EMC does not begin to decompose until approx. 180° C. has been exceeded.

During mixing of the Li/C compound from example 1 with NMP, a spontaneous, however weak reaction (without any run away phenomena) will be noted. During the subsequent Radex experiment, no significant exothermic effect will be noted up to an end temperature of 250° C. The thermolysed mixture is still liquid as before.

Example 2

Coating of a Lithiated Synthesis Graphite Powder of the Stoichiometry $LiC_6$ by Means of an LiBOB Solution in EC/EMC 4.5 g of a lithiated synthesis graphite powder, produced according to example 1, were mixed in a glass flask under an argon atmosphere with 10 ml of a 1% LiBOB solution (LiBOB=lithium bis(oxalato)borate) in anhydrous EC/EMC (1:1 wt/wt) and stirred for 2 hours at room temperature. Subsequently, the dispersion was filtered in the absence of air, washed three times with dimethyl carbonate and once each with diethyl ether and hexane. After drying under vacuum for 3 hours at room temperature, 4.3 g of a gold-glimmering dark powder were obtained.

Example 3

Stability of the Coated Product According to the Invention from Example 2 in EC/EMC and NMP Compared with the Uncoated Precursor Product The coated material from example 3 and a sample of the untreated lithiated graphite powder batch (production as per example 1) were examined in the Radex apparatus for thermal stability in the presence of an EC/EMC mixture.

It can be clearly seen that the uncoated material begins to decompose as early as from approx. 130° C., whereas the coated powder does not exothermically react until above approx. 170° C.

During mixing with NMP, no reaction is noted at room temperature. In the Radex experiment, very weak exotherma were registered only from approx. >90° C.

The mixture remains liquid.

Example 4

Air Stability of the Coated Product According to the Invention from Example 2 by Comparison with the Uncoated Precursor Product Material samples of in each case approx. 1 g of the coated lithiated graphite powder from example 3 as well as of the non-post-treated lithiated graphite powder were filled into a weighing bottle and were moved to air at approx. 23° C. and a relative humidity of 37%. From time to time, the increase in weight was noted. Whilst the coated powder maintained its gold-shimmering colour for more than 30 minutes, the uncoated material almost immediately discoloured (in <60 s) to become black.

In the experiment involving moving out to air (23° C., 37% rel. humidity) it can be seen that the weight of the uncoated lithiated powder increases as early as within the first 5 minutes by 5% by weight. The corresponding lithium salts form upon reaction with oxygen, humidity, carbon dioxide and nitrogen. By contrast, the coated powder is substantially more stable. However, the contained lithium reacts in a similar manner over a prolonged period of storage.

The invention claimed is:

1. A stabilized lithiated graphite powder, produced by a non-electrochemical method, having a molar ratio of graphite (C) to electrochemically active lithium (Li) in the range of from 3:1 to 600:1, characterized in that the stabilized lithiated graphite powder contains intercalated lithium and is coated with one or more thermodynamically stable salts formed by contacting the lithiated graphite powder with at least one coating agent selected from the group consisting of $N_2$, $CO_2$, CO, $O_2$, $N_2O$, NO, $NO_2$, HF, $F_2$, $PF_3$, $PF_5$, $POF_3$, carbonic acid esters, lithium chelatoborate solutions, sulphur organic compounds, nitrogen-containing organic compounds, phosphoric acid, organic phosphorus-containing compounds, fluorine-containing organic and inorganic compounds, silicon-containing compounds, and any combination of two or more of the foregoing.

2. The stabilized lithiated graphite powder according to claim 1, characterized in that the molar ratio of C:Li in the stabilized lithiated graphite powder is in the range of from 5:1 to 600:1.

3. The stabilized lithiated graphite powder according to claim 1, characterized in that the at least one coating agent comprises a lithium chelatoborate in an aprotic organic solvent, wherein the lithium chelatoborate is selected from the group consisting of lithium bis(oxalato)borate, lithium bis(salicylato)borate, lithium bis(malonato)borate, and lithium difluoro(oxalato)borate, and wherein the aprotic organic solvent is selected from the group consisting of oxygen-containing heterocycles, carbonates, nitriles, carboxylic acid esters, and ketones.

4. A method comprising:
lithiating a graphite powder with metallic lithium to form a lithiated graphite powder by a non-electrochemical method; and
contacting the lithiated graphite powder with at least one coating agent so as to form a stabilizing coating layer on the lithiated graphite powder using a non-electrochemical method, wherein the at least one coating agent comprises one selected from the group consisting of $N_2$, $CO_2$, CO, $O_2$, $N_2O$, NO, $NO_2$, HF, $F_2$, $PF_3$, $PF_5$, $POF_3$, carbonic acid esters, lithium chelatoborate solutions, sulphur organic compounds, nitrogen-containing organic compounds, phosphoric acid, organic phosphorus-containing compounds, fluorine-containing organic and inorganic compounds, silicon-containing compounds, and any combination of two or more of the foregoing.

5. The method according to claim 4, characterized in that the contacting step is carried out at a temperature in the range of from 0° C. to 150° C.

6. A lithium battery electrode comprising the stabilized lithiated graphite powder according to claim 1 as a component and/or active material.

7. The lithium battery electrode according to claim 6, characterized in that the molar ratio of C:Li in the stabilized lithiated graphite powder is in the range of from 5:1 to 600:1.

8. A galvanic cell comprising a cathode, a lithium-conductive electrolyte separator system and a graphite-containing anode comprising the stabilized lithiated graphite powder according to claim 1.

9. The galvanic cell according to claim 8, characterized in that the molar ratio of C:Li in the stabilized lithiated graphite powder is in the range of from 5:1 to 600:1.

10. A method for producing a lithium battery anode, comprising:
forming a mixture by mixing the stabilized lithiated graphite powder according to claim 1 under inert or dry room conditions with
(A) at least one binder material,
(B) optionally at least one further material in powder form, which is capable of intercalating lithium, with an electrochemical potential ≤2 V vs. Li/Li$^+$ and
(C) optionally an additive for improving conductivity, and,
(D) a non-aqueous solvent,
homogenizing the mixture;
applying the mixture, in the form of a dispersion, to a current collector foil; and
drying the current collector foil having the mixture thereon.

11. The method according to claim 10, wherein the mixture comprises the at least one further material in powder form, wherein the at least one further material in powder form is selected from the group consisting of graphites, graphene, layer-structured lithium transition metal nitrides, metal powder capable of alloying with lithium, main group metal oxides with a metal that alloys with lithium in the reduced form, metal hydrides, lithium amide, lithium imide, tetralithium nitride hydride, black phosphorus, and transition metal oxides that are capable of reacting with lithium according to a conversion mechanism under absorption of lithium.

12. The method according to claim 10, characterized in that the non-aqueous solvent comprises at least one member selected from the group consisting of hydrocarbons, N-methyl-pyrrolidone, N-ethyl-pyrrolidone, toluene dimethyl sulfoxide, ketones, lactones and cyclic ethers.

13. The method according to claim 10, characterized in that the binder is selected from the group consisting of polyvinylidene fluoride, carboxymethyl cellulose (CMC), alginic acid, polyacrylates, Teflon and polyisobutylene.

14. The stabilized lithiated graphite powder according to claim 1 wherein in the contacting step the lithiated graphite powder reacts with the at least one coating agent so as to form a stabilization layer on the surface of the lithiated graphite powder.

* * * * *